United States Patent Office 3,451,256
Patented June 24, 1969

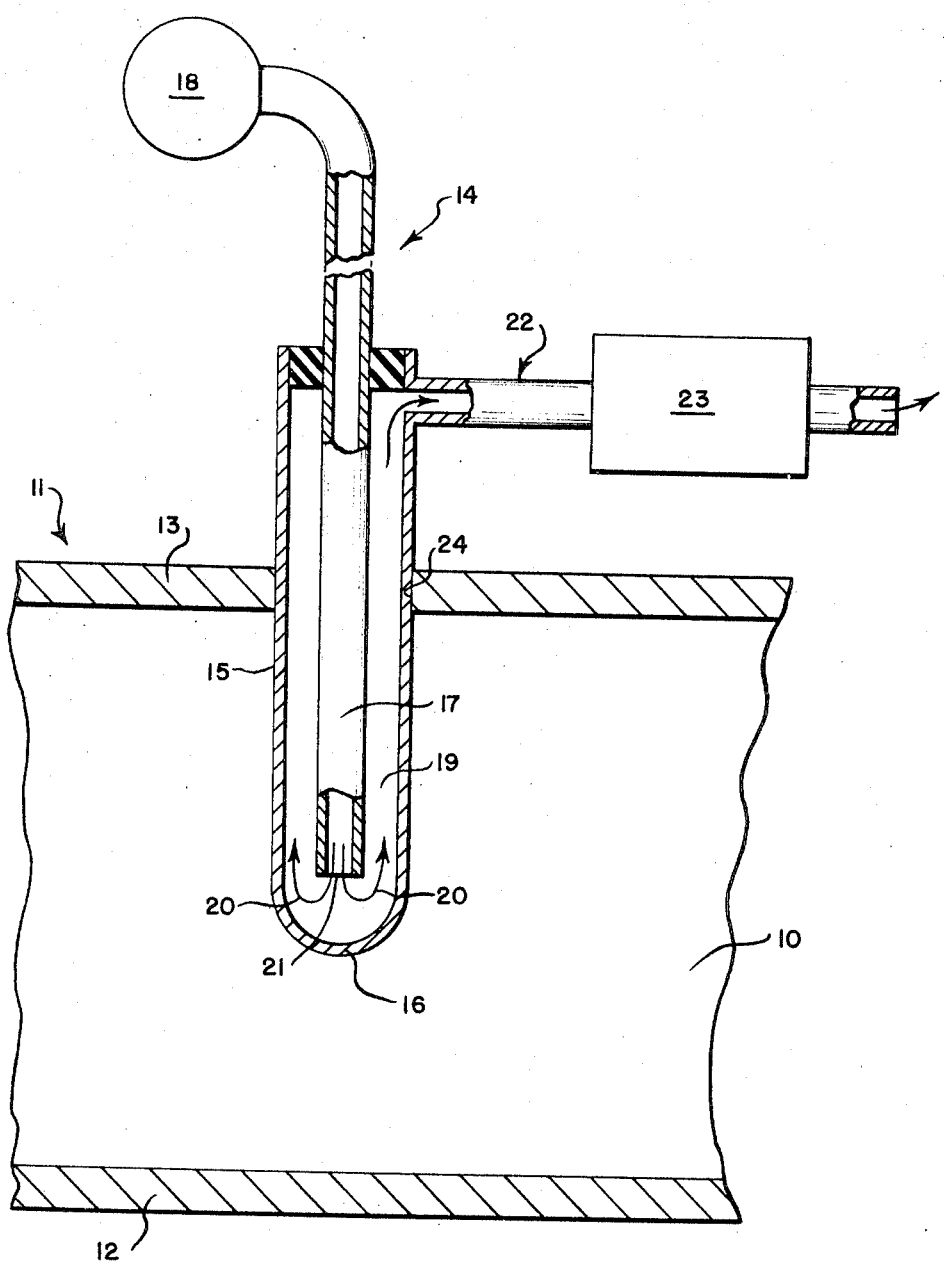

3,451,256
APPARATUS FOR THE DETERMINATION OF CARBON IN A FLUID
Morris Kolodney, River Edge, N.J., assignor to United Nuclear Corporation, Elmsford, N.Y., a corporation of Delaware
Continuation-in-part of application Ser. No. 422,762, Dec. 31, 1964. This application Nov. 8, 1967, Ser. No. 681,073
Int. Cl. G01n 31/00
U.S. Cl. 73—23      12 Claims

ABSTRACT OF THE DISCLOSURE

The carbon content in a fluid, e.g. molten metal or carburizing gas, is measured by immersing thereinto a thin-walled ferrous or nickel metal tube having a closed end and introducing a stream of decarburizing gas which preferably is a mixture of hydrogen, water vapor and an inert gaseous carrier into the closed end of the tube. The decarburizing gas contacts and sweeps the interior of the tube and reacts with the carbon permeated therethrough. The decarburizing gas is then removed from the tube and its composition is analyzed to determine the content of carbon in the molten metal.

Cross-reference to related application

This application is a continuation-in-part application of my co-pending application Ser. No. 422,762, filed on Dec. 31, 1964, now abandoned.

BACKGROUND OF THE INVENTION

Field of the invention

This invention relates to a device for determining the carbon content of a fluid such as molten metal and carburizing gas.

Description of the prior art

Continuous determination of carburizing potential of various environments is essential in many industrial operations. For example, in the steel industry, a carbon bearing atmosphere is generally used for carburizing steel. An accurate measure of carburizing potential of the atmosphere is useful in determining the degree of reaction or carburization, which oftentimes becomes an important requirement for the success of the operation. In another important industrial operation in which liquid metals were involved, the presence of carbon therein has been known to cause damage or create other difficulties when such metals are brought into contact with solid metal or clad metal structures. This is particularly true when such contact occurs at temperatures of 1000° F., and above. For example, the surface carbon content of austenitic stainless steel in contact with carbon-saturated molten sodium reaches a level of 3 weight percent after only one hour exposure at 1000° F. to 1300° F. Thin metal sheet and thin metal cladding for fuel rods become severely embrittled under such conditions. Refractory metals are as adversely affected as steel. Although the carburizing potential of these media may be inferred from chemical analysis, it is far more efficient to measure it continuously and directly.

Heretofore, the continuous determining carburizing potential of a gaseous atmosphere, thermoelectric elements were used to determine the electrical property of a relatively stagnant atmosphere within a closed chamber which communicates with the gaseous atmosphere to be measured by using a membrane with selective permeability for one or more components in the gas atmosphere. The relatively low immobility of the atmosphere in the closed chamber, however, greatly lowers the sensitivity of the apparatus, particularly in relatively low temperature applications.

SUMMARY OF THE INVENTION

I have now discovered that the carbon content of a fluid can be measured continuously and accurately using the apparatus of this invention. Moreover, my new apparatus has simple construction and will react rapidly to variations in carbon levels of the fluid and thereby provide a continuous record of such levels. Broadly stated, the method of this invention comprises directing the fluid to a contacting space wherein it is separated from an inner zone with a metal closure resistant to the attack of the fluid and having at least a portion of its surface area in which elemental carbon will dissolve and diffuse at an elevated temperature above about 400° C. Advantageously the temperature of the fluid is adjusted to above about 700° C. An exterior source of decarburizing gas is introduced into the interior of the inner zone causing it to come into contact with the interior surface of the metal enclosure. The decarburizing gas together with the reaction product of the diffused carbon on the metal enclosure and the decarburizing gas is then removed and is analyzed for the content of the reaction product which corresponds to the carbon content in the fluid.

Advantageously, the method of this invention is carried out with a device which comprises a metal tube having a closed end that is adapted to be immersed in the high temperature fluid the carbon content of which is to be measured. The tube is formed of a metal in which elemental carbon will dissolve and diffuse at the temperature at which the fluid is maintained and which is not subject to attack by the fluid at this temperature. There is a source of decarburizing gas positioned at the exterior of the molten metal and means for introducing said decarburizing gas into the interior of the metal tube whereby the interior of said tube is contacted by and swept with said gas. Gas outlet means through which unconsumed decarburizing gas and the reaction product of said decarburizing gas and carbon leave said metal tube, are used in combination with gas analysis means associated for determining the quantity of the carbon-containing reaction product in the gas stream leaving the device.

DESCRIPTION OF THE PREFERRED EMBODIMENT

A particular embodiment of the carbon metering device of my invention is used for determining the carbon content of a high temperature fluid such as a carburizing gas or a liquid alkali metal and is capable of responding within about three minutes to a change in the carbon content of the fluid. The preferred embodiment comprises a closed-end steel tube having a wall thickness of less than about 25 mils. The closed end portion of the steel tube is exposed to or is otherwise immersed in the fluid whose carbon content is to be determined so that at least three square centimeters of its exterior surface area is in intimate contact with the fluid. Means are provided for continuously sweeping the entire interior of the steel tube with hydrogen which reacts with carbon at the interior surface of the steel tube to form methane, the carbon at this interior surface having migrated from the high temperature fluid through the wall of the steel tube. The device also is provided with gas outlet means through which the mixture of unconsumed hydrogen and the aforementioned methane reaction product leaves the steel tube, and with gas analysis means advantageously comprising a gas chromatograph or a flame ionization detector for determining the quantity of methane in the effluent gases emerging from the device. The gas chromatograph employed preferably should be capable of detecting a fractional change of at least 0.1 in the quantity of methane in the effluent gases.

For a better understanding of my invention, its advantages and the specific objects attained with its use, reference should be had to the accompanying drawing, the single figure of which is a diagrammatic sectional view of an advantageous embodiment of the invention described herein.

As shown in the drawing, the molten or liquid metal 10, the carbon content of which is to be measured, for example, carbon-containing molten sodium or potassium or the like, is disposed within a vessel 11 having walls 12 and 13. The metering device of my invention, generally numbered 14, comprises a metal tube 15 having a closed end 16 immersed in the liquid metal 10. The metal out of which tube 15 is made is one in which the carbon in metal 10 will dissolve and diffuse at the temperature at which the liquid metal 10 is expected to be maintained. Generally, nickel and ferrous metals, and in particular substantially pure iron or low carbon steel, as well as pure nickel or nickel iron alloys meet this requirement. Accordingly, these metals are preferred. The wall or walls of tube 15 are thin, and preferably are less than 25 mils in thickness.

In the preferred embodiment of the invention, the means for sweeping out the interior of the tube with a decarburizing gas comprises a second tube 17 disposed within tube 15 and adapted to deliver a stream of decarburizing gas from a gas source 18 into the interior 19 of the tube 15. The tube 17 is positioned so that the stream of decarburizing gas emerging from the open end 21 of the tube will contact the interior surface of the tube 15 and will effectively sweep out the entire interior volume 19 of the tube. Other means for delivering the decarburizing gas to tube 15 may be employed provided such means also performs the function of effectively contacting the entire interior surface of tube 15 with a moving stream of the decarburizing gas.

Carbon present in the metal 10 comes into contact with the exterior surface of tube 15, and, as a result of steady-state reaction conditions, dissolves in and diffuses or migrates through the wall of tube 15 to the interior surface of the tube. The carbon at the interior surface of tube 15 reacts with the decarburizing gas 20 to form a gaseous reaction product which is swept along by the stream of gas 20. I presently prefer to employ hydrogen as the decarburization gas, although other conventional decarburizing gases such as carbon dioxide or water vapor may also be employed, and the decarburizing gas is advantageously mixed with an inert diluent gas such as argon or nitrogen in order to reduce the partial pressure of the decarburizer. When hydrogen is used as the decarburizing gas, the gaseous reaction product is methane; when water vapor is used, the reaction product is mixture of carbon monoxide and hydrogen; and when carbon dioxide is employed the reaction product is carbon monoxide. A preferred decarburizing gas is a mixture of hydrogen, water vapor and an inert gaseous carrier.

Tube 15 is provided with gas outlet means 22 through which the mixture of the decarburizing gas and the reaction product of the decarburizing gas with carbon is delivered to the gas analyzing means 23 for determination of the quantity of the carbon-containing reaction product in the gaseous mixture. Gas analysis means 23 is preferably a gas chromatograph which has a capability of detecting and determining accurately the quantity of the carbon-containing reaction product in the gas emerging from outlet means 22. For gas having high concentration of methane, flame ionization detection equipment is suitable for its detection, for example, in the parts per billion range. Hence, such equipment is efficacious in the device of this invention. Methane in the gas effluent of tube 15 will usually not be below one part per million depending upon the concentration of carbon in metal 10 and the flow rate of the hydrogen. The accuracy of modern gas chromatographs is such that their inability to detect methane, for example, in the effluent gases of the device of this invention may be taken to mean that the carbon content of the molten metal is negligible or zero.

The carbon meter of my invention when used to monitor the carbon content of molten metal, operates in the following manner:

As previously noted, the tube 15 extends through an opening 24 formed in the wall 13 of the vessel 11 so that the closed end 16 of the tube is immersed in the molten metal. Prior to the introduction of a decarburizing gas into the tube 15, the carbon content of the metal of the tube in contact with the molten metal 10 attains an equilibrium level or concentration which is dependent upon the temperature of and the concentration of carbon in the molten metal 10. When a decarburizing gas, for example, a mixture of hydrogen and argon, is delivered to the interior of the tube 15 by means of tube 17 in the manner previously described, the decarburizing gas stream contacts the inner surface of the tube 15 and reacts with the carbon dissolved in the metal tube to form a carbon-containing gaseous reaction product such, for example, as methane. The quantity of the gaseous product formed by the decarburization reaction will depend on the availability (i.e., the concentration) of carbon at the inner surface of the tube 15, the amount of decarburizing gas contacting this surface, and the pressure and temperature of the gas. As the carbon content at the inner surface of the tube 15 is depleted by the decarburization reaction, additional carbon diffuses or migrates to this surface from other portions of the tube 15, thereby causing a progressive decrease in the carbon content of the tube extending from the outer surface of the tube wall to the inner surface thereof. However, as the outer surface of the tube 15 is in contact with the carbon-containing molten metal, additional carbon will dissolve in the tube 15 at the outer surface to replace or make up for the carbon that migrates from this surface toward the inner surface of the tube, thereby tending to establish equilibrium conditions with respect to the carbon content of the molten metal and the surface of the tube 15 in contact therewith and also with respect to the carbon content of the decarburization gas and the inner surface of the tube in contact therewith. Thus, under steady state conditions wherein the temperature and carbon content of the molten metal remain substantially unchanged and wherein a steady stream of decarburizing gas is passed through the tube 15, equilibrium conditions prevail throughout the system and the gas stream leaving the tube 15 contains a definite and predictable quantity of the gaseous product of the decarburization reaction. The quantity of the carbonaceous reaction product in the gas stream leaving the device is measured by the gas analyzing means 23, for example, a gas chromatograph and/or a flame ionization meter, and this provides an accurate measure of the concentration of carbon in the molten metal 10.

Any change in the steady state operating conditions, for example, a change in the carbon content of the molten metal, will be reflected by a change in the quantity of the gaseous reaction product in the gas stream leaving the tube 15. For example, if the amount of carbon in the molten metal increases for some reason, the amount of carbon dissolved in the wall of the metal tube 15 and, within a relatively short time, the amount of carbonaceous reaction product in the gas stream leaving the tube 15 will also increase by a corresponding amount. The increase in the amount of carbonaceous reaction product is detected and measured by the gas analysis means 23, and thus the carbon content of the molten metal is continuously monitored.

For application in high temperature fluid such as for monitoring carburizing atmosphere, the apparatus as described hereinabove may be used to great advantage. It is, however, noted that the thickness of the wall of the metal tube should be varied to correspond with the temperature of the fluid. A thinner tube is required for low temperature gaseous atmosphere whereas a thicker is acceptable when temperatures are extremely high, i.e. about 800° C. For measurement of carbon content in the gaseous atmosphere, the temperature of the fluid should be above about 400° C. It is noted that temperatures at much below this level will reduce the sensitivity of the device of this invention due to the low permeability of the carbon.

I claim:

1. A device for measuring the carbon content of molten metal which comprises a metal tube having a closed end that is adapted to be immersed in the molten metal the carbon content of which is to be measured, said tube being formed of a metal in which elemental carbon will dissolve and diffuse at the temperature at which the molten metal is maintained and which is not subject to attack by the molten metal at this temperature, a source of decarburizing gas positioned at the exterior of the molten metal, means for introducing said decarburizing gas into the interior of the metal tube whereby the interior of said tube is contacted by and swept with said gas, gas outlet means through which unconsumed decarburizing gas and the reaction product of said decarburizing gas and carbon leave said metal tube, and gas analysis means associated with the gas outlet means for determining the quantity of the carbon-containing reaction product in the gas stream leaving the device.

2. A device for measuring the carbon content of molten metal which comprises a thin-walled ferrous metal tube having a closed end adapted to be immersed in the molten metal the carbon content of which is to be measured, said tube being formed of a ferrous metal in which elemental carbon will dissolve and diffuse at the temperature at which the molten metal is maintained and which is not subject to attack by the molten metal at this temperature, a source of decarburizing gas positioned at the exterior of the molten metal, means for introducing said decarburizing gas into the interior of the metal tube whereby the interior of said tube is contacted by and swept with said gas, gas outlet means through which the unconsumed decarburizing gas and the reaction product of said decarburizing gas and carbon leave said ferrous metal tube, and gas analysis means connected to the gas outlet means for determining the quantity of the carbon-containing reaction product in the gas stream leaving the device.

3. The device according to claim 2 in which the decarburizing gas is selected from the group consisting of hydrogen, water vapor and carbon dioxide.

4. The device according to claim 2 in which the ferrous metal of the tube is selected from the group consisting of substantially pure iron and low carbon steel.

5. A device for measuring the carbon content of molten alkali metal which comprises a thin-walled ferrous metal tube having a closed end adapted to be immersed in the molten metal the carbon content of which is to be measured, said tube being formed of a ferrous metal in which elemental carbon will dissolve and diffuse at the temperature at which the molten alkali metal is maintained and which is not subject to attack by the molten metal at this temperature, a second tube of smaller diameter than the ferrous metal tube concentrically mounted within said tube and adapted to introduce a decarburizing gas into the interior of the ferrous metal tube whereby the interior of said tube is contacted by and swept with said gas, gas outlet means through which the unconsumed decarburizing gas and the reaction product of said decarburizing gas and carbon leave said metal tube, and gas analysis means connected to the gas outlet means for determining the quantity of the carbon-containing reaction product in the gas stream leaving the device.

6. The device according to claim 5 in which the decarburizing gas is selected from the group consisting of hydrogen, water vapor and carbon dioxide.

7. The device according to claim 5 in which the ferrous metal tube is fabricated from a metal selected from the group consisting of substantially pure iron and low carbon steel.

8. The device according to claim 5 in which the gas analysis means comprises a gas chromotagraph.

9. A device for measuring the carbon content of a high temperature fluid which comprises a metal tube having a closed end that is adapted to be immersed in the fluid the carbon content of which is to be measured, said tube being formed of a metal in which elemental carbon will dissolve and diffuse at the temperature at which the fluid is maintained and which is not subject to attack by the fluid at this temperature, a source of decarburizing gas positioned at the exterior of the high temperature fluid, means for introducing said decarburizing gas into the interior of the metal tube whereby the interior of said tube is contacted by and swept with said gas, gas outlet means through which unconsumed decarburizing gas and the reaction product of said decarburizing gas and carbon leave said metal tube, and gas analysis means associated with the gas outlet means for determining the quantity of the carbon-containing reaction product in the gas stream leaving the device.

10. The device according to claim 9 in which the decarburizing gas is selected from one or more of a group consisting of hydrogen, water vapor and carbon dioxide.

11. The device according to claim 9 in which the metal of the tube is selected from the group consisting of substantially pure iron and low carbon steel.

12. The device according to claim 9 in which the decarburizing gas is a mixture comprising hydrogen, water vapor and inert gaseous carriers.

References Cited

UNITED STATES PATENTS

| | | | |
|---|---|---|---|
| 2,841,005 | 7/1958 | Coggeshall | 73—23.1 |
| 2,909,919 | 10/1959 | Myer | 73—23 |
| 2,935,866 | 5/1960 | Schmidt et al. | 73—27 |
| 2,941,395 | 6/1960 | Myer | 73—23 |
| 3,221,537 | 12/1965 | Jacobsen | 73—23 |

RICHARD C. QUEISSER, *Primary Examiner.*

JOHN P. BEAUCHAMP, *Assistant Examiner.*

U.S. Cl. X.R.

73—19, 53